(12) United States Patent
Noll

(10) Patent No.: US 8,430,792 B2
(45) Date of Patent: Apr. 30, 2013

(54) DOWNHILL VEHICLE SPEED CONTROL ALGORITHM FOR ELECTRIC DRIVEN VEHICLES

(75) Inventor: Markus Noll, Worms (DE)

(73) Assignee: GM Global Technology Operations LLC, Detroit, MI (US)

( * ) Notice: Subject to any disclaimer, the term of this patent is extended or adjusted under 35 U.S.C. 154(b) by 1683 days.

(21) Appl. No.: 11/557,710

(22) Filed: Nov. 8, 2006

(65) Prior Publication Data

US 2008/0108477 A1    May 8, 2008

(51) Int. Cl.
*B60W 10/18* (2012.01)
(52) U.S. Cl.
USPC ............................................. 477/23; 477/25
(58) Field of Classification Search ............ 477/21, 477/23, 25; 303/3; 180/168, 170, 65.1, 65.2, 180/65; 701/22, 70, 93
See application file for complete search history.

(56) References Cited

U.S. PATENT DOCUMENTS

| | | | |
|---|---|---|---|
| 5,234,071 A | 8/1993 | Kajiwara | |
| 6,488,345 B1* | 12/2002 | Woody et al. | 303/152 |
| 6,573,675 B2* | 6/2003 | Schmitz et al. | 318/434 |
| 2004/0129470 A1 | 7/2004 | Huelser et al. | |
| 2005/0200197 A1* | 9/2005 | Crombez et al. | 303/152 |
| 2005/0231144 A1* | 10/2005 | Takano | 318/376 |

* cited by examiner

*Primary Examiner* — David D Le
(74) *Attorney, Agent, or Firm* — John A. Miller; Miller IP Group, PLC

(57) ABSTRACT

A control system that prevents an electric vehicle from increasing its speed on a downhill gradient by providing regenerative braking through a traction motor. The system includes an enable circuit that provides an enable signal if certain criteria are met, such as a brake pedal and an acceleration pedal being inactive. The system further includes a controller that is enabled by the enable signal, and receives a vehicle speed signal of the speed of the vehicle. The system also includes a switch that receives the enable signal and the vehicle speed signal. When the enable circuit provides the enable signal, the switch provides a speed set-point to the controller for the last vehicle speed. If the vehicle speed signal goes above the speed set-point, the controller outputs a regenerative braking torque command to the traction motor to reduce the speed of the vehicle to the speed set-point.

18 Claims, 2 Drawing Sheets

DOWNHILL VEHICLE SPEED CONTROL ALGORITHM FOR ELECTRIC DRIVEN VEHICLES

BACKGROUND OF THE INVENTION

1. Field of the Invention

This invention relates generally to a method for controlling the speed of an electrically driven vehicle and, more particularly, to a method for controlling the downhill speed of an electrically driven vehicle that prevents the vehicle speed from increasing beyond a speed set-point by using regenerative braking.

2. Discussion of the Related Art

The dynamic power of a fuel cell system for a vehicle is limited. Further, the time delay from system start-up to driveability and low acceleration of the vehicle may not be acceptable. During a drive cycle, the stack fuel cell voltages vary because the variable driver power request follows the stack polarization curve. The voltage cycles can decrease the stack durability. These drawbacks can be minimized by using a high voltage battery in parallel with the fuel cell stack. Algorithms are employed to provide the distribution of power from the battery and the fuel cell stack to meet the requested power.

For the reasons discussed above, some fuel cell vehicles are hybrid vehicles that employ a rechargeable supplemental power source in addition to the fuel cell stack, such as a DC battery or a super capacitor (also referred to as an ultracapacitor or double layer capacitor). The power source provides supplemental power for the various vehicle auxiliary loads, for system start-up and during high power demands when the fuel cell stack is unable to provide the desired power. More particularly, the fuel cell stack provides power to a traction motor and other vehicle systems through a DC voltage bus line for vehicle operation. The battery provides the supplemental power to the voltage bus line during those times when additional power is needed beyond what the stack can provide, such as during heavy acceleration. For example, the fuel cell stack may provide 70 kW of power. However, vehicle acceleration may require 100 kW or more of power. The fuel cell stack is used to recharge the battery at those times when the fuel cell stack is able to meet the system power demand. The generator power available from the traction motor during regenerative braking is also used to recharge the battery through the DC bus line.

FIG. 1 is a schematic block diagram of a hybrid fuel cell system 10 including a fuel cell stack 12 and a battery 14 that includes power electronics. In order to provide battery charge or discharge, a voltage difference is needed between the stack voltage and the battery voltage that is greater than or equal to the battery charge. When the stack voltage is greater than the battery voltage, the power electronics operates as a voltage amplifier where the gain is less than or equal to one. The fuel cell stack 12 provides electrical power to a high voltage bus line, represented here as positive bus line 16 and a negative bus line 18. The battery 14 is also coupled to the high voltage bus line 16 and 18, and provides supplemental power as discussed above.

The fuel cell system 10 includes a power inverter module (PIM) 22 electrically coupled to the bus lines 16 and 18 and a traction motor 24. The PIM 22 controls the traction motor 24 and converts the DC voltage on the bus lines 16 and 18 to an AC voltage suitable for the AC traction motor 24. The traction motor 24 provides the traction power to operate the vehicle, as is well understood in the art. The traction motor 24 can be any suitable motor for the purposes described herein, such as an AC induction motor, an AC permanent magnet motor and an AC three-phase synchronous machine. During regenerative braking when the traction motor 24 is operating as a generator, electrical AC power from the motor 24 is converted to DC power by the PIM 22, which is then applied to the bus lines 16 and 18 to recharge the battery 14.

When a vehicle travels downhill, the speed of the vehicle will generally increase depending on the gradient of the hill. The vehicle operator can apply brake pressure to the brake pedal to maintain the speed of the vehicle relatively constant as it is going downhill, but the brakes may become overheated as a result of the braking required to reduce the vehicle speed. Also, for certain types of vehicles, the vehicle can be slowed down by using engine braking, i.e., shifting to a lower gear for both manual and automatic transmissions. However, it would generally be difficult to use the braking torque of the engine to provide a constant speed when going downhill, because it requires the vehicle operator to continuously be providing gear shifts and brake applications.

SUMMARY OF THE INVENTION

In accordance with the teachings of the present invention, a control system is disclosed that prevents an electric vehicle from increasing its speed on a downhill gradient by providing regenerative braking through a traction motor. The system includes an enable circuit that provides an enable signal if certain criteria are met, such as a brake pedal and an acceleration pedal being inactive. The system further includes a controller that is enabled by the enable signal, and receives a vehicle speed signal of the speed of the vehicle. The system also includes a switch that receives the enable signal and the vehicle speed signal. When the enable circuit provides the enable signal, the switch provides a speed set-point to the controller for the last vehicle speed. If the vehicle speed signal goes above the speed set-point, the controller outputs a regenerative braking torque command to the traction motor to reduce the speed of the vehicle to the speed set-point.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a control algorithm for controlling the speed of an electrical vehicle on a downhill gradient is merely exemplary in nature, and is in no way intended to limit the invention or its applications or uses. For example, the control algorithm of the present invention has particular application for a fuel cell vehicle employing a battery and an electrical traction system. However, as will be appreciated by those skilled in the art, the present invention also has application for any type of electrically driven vehicle, including an internal combustion hybrid vehicle.

Figure 1:
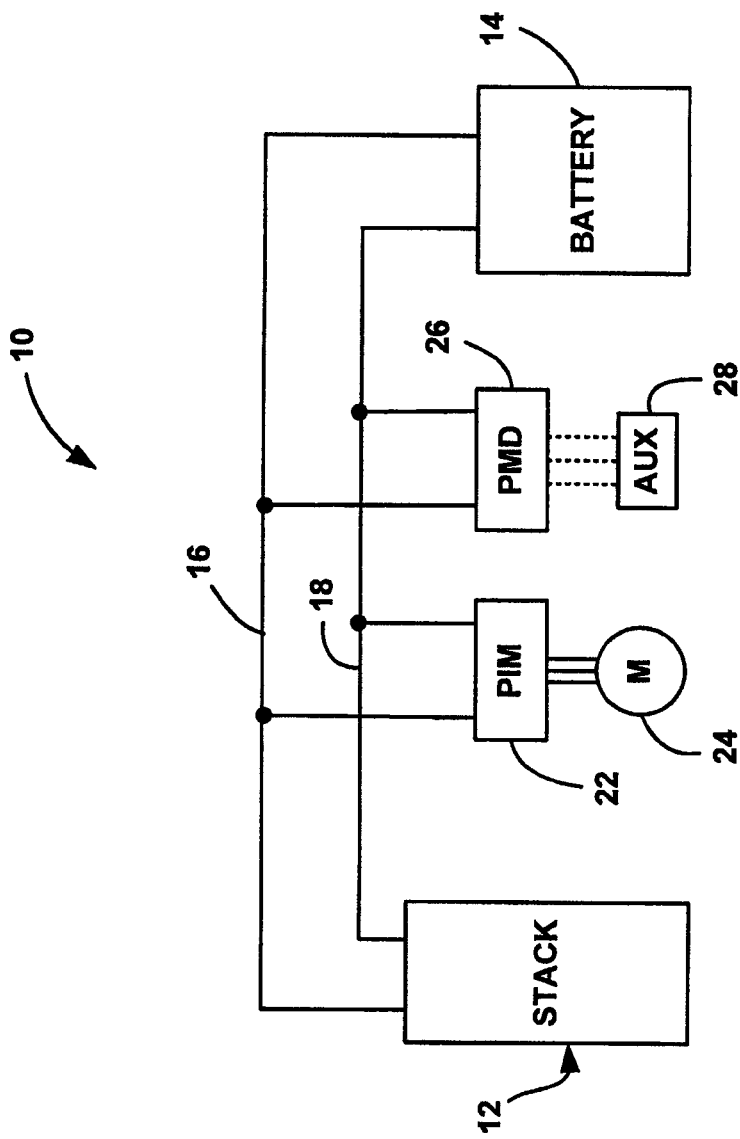
FIG. 1 is a schematic block diagram of a fuel cell system for a vehicle including a fuel cell stack and a high voltage battery.
Figure 2:
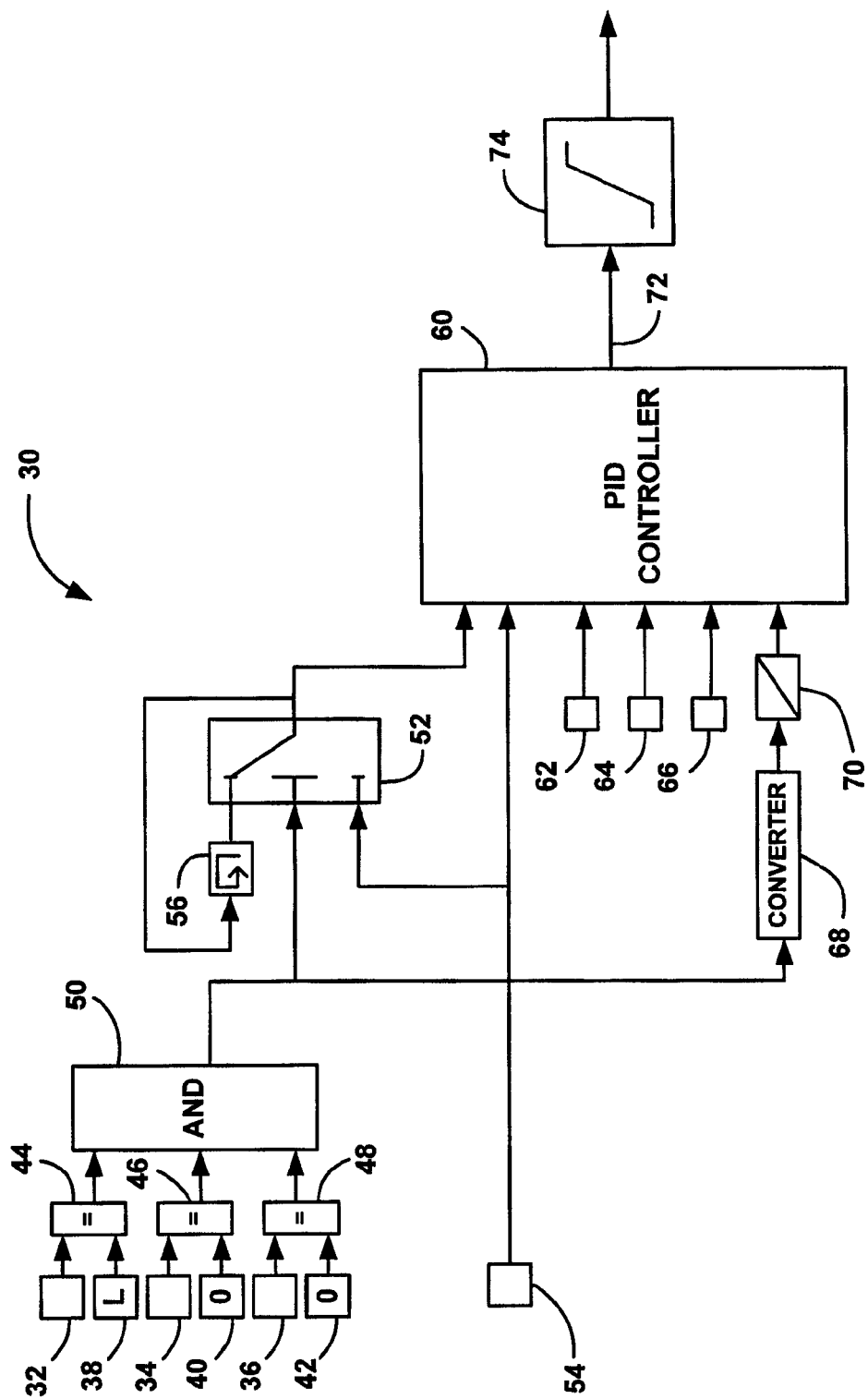
FIG. 2 is a block diagram of a controller for controlling the speed of an electric vehicle using regenerative braking, according to an embodiment of the present invention.

FIG. 2 is a block diagram of a control system 30 for controlling the speed of an electrically driven vehicle traveling downhill. The position of the shifter of the vehicle is provided at node 32, the position of the acceleration pedal of the vehicle is provided at node 34 and the position of the brake pedal of the vehicle is provided at node 36. Also, a predetermined shifter position, such as a low position, is provided at node 38, an acceleration pedal position of zero (no acceleration) is provided at node 40 and a brake pedal position of zero (no brake pressure) is provided at node 42. A comparator 44 compares the shifter position to the predetermined position, and outputs a logical one if the shifter position is at the predetermined position. Likewise, a comparator 46 compares the acceleration pedal position to zero, and if the acceleration pedal is at zero, outputs a logical one. Also, a comparator 48 compares the brake pedal position to zero, and outputs a logical one if the brake pedal is at position zero.

The outputs of the comparators 44, 46 and 48 are applied to an AND gate 50 that outputs a logical one, referred to herein as an enable signal, if all of the outputs of the comparators 44, 46 and 48 are a logical one. Therefore, the control algorithm of the invention is not enabled unless these three criteria are met, i.e., the shifter position is at a predetermined position, and the acceleration pedal and brake pedal are at zero. Requiring that the shifter be in a certain position to enable the control algorithm will not be necessary in many embodiments. In those embodiments, the control algorithm can be enabled for all forward gears.

The output of the AND gate 50 is applied to a selection input of a switch 52 that determines the position of the switch 52 based on whether the output of the AND gate 50 is a logical one (high) or a logical zero (low). A vehicle speed signal from node 54 is provided to one input of the switch 52 and the output of the switch 52 is applied to another input of the switch 52 through a recirculator 56 that maintains the input and the output of the switch 52 the same. When the output of the AND gate 50 is low, the switch 52 is coupled to the vehicle speed input. If the control system 30 is enabled when the output of the AND gate 50 goes high, the switch 52 switches to the input shown where the last vehicle speed is returned to the input of the switch 52 to set the vehicle speed at that speed set-point.

The speed signal from the switch 52 and from the node 54 is sent to a proportional-integral-derivative (PID) controller 60. The gains of the PID controller 60 are set at vehicle development based on certain tests. Particularly, the proportional gain is provided at node 62, the integral gain is provided at node 64 and the derivative gain is provided at node 66. The output of the AND gate 50 is also provided to a reset input of the PID controller 60 through a converter 68 and a hit/miss circuit 70. If the output of the AND gate 50 is low, then the PID controller 60 does not implement the control algorithm for controlling the speed of the vehicle using regenerative braking torque. However, when the output of the AND gate 50 goes high, the reset input to the PID controller 60 activates the speed control provided by the electric traction system of the vehicle to prevent the vehicle speed from increasing. The converter 68 converts the boolean value from the AND gate 50 to an integer suitable for the reset input of the PID controller 60. The converter 68 has two possible goals. One goal is to have the real world values of the input and output be equal, and the other goal is to have stored integer values of the input and output be equal. The hit/miss circuit 70 compares the input value (logical 0 or 1) to a hit crossing offset value, and if the input value rises above the offset value, the hit/miss circuit 70 outputs a one, otherwise it outputs a zero. In one non-limiting embodiment, the offset value is 0.5. This allows the PID controller 60 to be reset at the beginning of its active period.

When the PID controller 60 is enabled, it compares the actual vehicle speed signal from the node 54 to the speed set-point from the switch 52 and outputs a signal on line 72 if the vehicle speed increases above the speed set-point. The signal is applied to a negative saturation circuit 74 that outputs a negative signal sent to the electric traction system controller, such as the PIM 22, that controls the traction motor 24 to apply regenerative braking to the vehicle to maintain the vehicle speed constant at the speed set-point. The signal from the controller 60 is proportionate to the amount of braking that is necessary to reduce the speed of the vehicle to the speed set-point.

If the vehicle speed decreases when the PID controller 60 is enabled, the output of the PID controller will be zero, and has no effect on the vehicle speed. If the driver increases the vehicle speed using the accelerator pedal, then the output of the AND gate 50 would go to zero, disabling the PID controller 60. If the vehicle continues downhill, and the driver releases the acceleration pedal once it reached the driver's desired speed, the PID controller 60 would be reactivated for that new vehicle speed set-point.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A system for preventing the speed of an electrical vehicle from increasing, said system comprising:
   an electric traction motor that is able to provide regenerative braking to the vehicle; and
   a controller for controlling the electric traction motor to prevent the speed of the vehicle from increasing, said controller being responsive to a vehicle speed signal and an enable signal, said controller comparing the speed signal to a speed set-point and providing a torque command that causes the traction motor to provide regenerative braking torque to the vehicle to prevent the speed of the vehicle from increasing above the speed set-point.

2. The system according to claim 1 further comprising an enable circuit that generates the enable signal to enable the controller only if predetermined criteria are met.

3. The system according to claim 2 further comprising a switch that receives the vehicle speed signal and the enable signal, said switch outputting a last vehicle speed signal as the speed set-point to the controller when the switch is receiving the enable signal.

4. The system according to claim 2 wherein the predetermined criteria include that a position of an acceleration pedal of the vehicle is zero and a position of a brake pedal of the vehicle is zero.

5. The system according to claim 4 wherein the predetermined criteria further include that a shifter position of the vehicle is at a predetermined position.

6. The system according to claim 1 further comprising a negative saturation circuit that converts the torque command from the controller to a negative signal.

7. The system according to claim 1 wherein the controller is a proportional-integral-derivative controller.

8. The system according to claim 1 wherein the vehicle is a fuel cell vehicle including a fuel cell stack and the electric traction motor.

9. A system for preventing the speed of an electrical vehicle from increasing, said system comprising:

an electric traction motor that is able to provide regenerative braking to the vehicle;

an enable circuit that generates an enable signal only if predetermined criteria are met, said predetermined criteria including that a brake pedal and an acceleration pedal of the vehicle are not being pressed;

a switch that receives a vehicle speed signal of the speed of the vehicle and the enable signal, said switch outputting a last vehicle speed signal as a speed set-point when the switch is receiving the enable signal; and a controller responsive to the vehicle speed signal, the speed set-point and the enable signal, said controller comparing the vehicle speed signal to the speed set-point when the controller is receiving the enable signal, and providing a torque command that causes the traction motor to provide regenerative braking torque to the vehicle to prevent the speed of the vehicle from increasing above the speed set-point.

10. The system according to claim 9 wherein the predetermined criteria further include that a shifter position of the vehicle is at a predetermined position.

11. The system according to claim 9 further comprising a negative saturation circuit that converts the torque command from the controller to a negative signal.

12. The system according to claim 9 wherein the controller is a proportional-integral-derivative controller.

13. The system according to claim 9 wherein the vehicle is a fuel cell vehicle including a fuel cell stack and the electric traction motor.

14. A method for preventing the speed of an electric vehicle from increasing, said method comprising:

providing an enable signal only if predetermined criteria are met including that a brake pedal and an acceleration pedal of the vehicle are not being pressed;

defining a speed set-point as a last vehicle speed when the enable signal is provided; and causing an electric traction motor to provide regenerative braking torque to prevent the speed of the vehicle from increasing above the speed set-point.

15. The method according to claim 14 wherein the predetermined criteria further includes that a shifter position of the vehicle is at a predetermined position.

16. The method according to claim 14 wherein causing the electric traction motor to provide regenerative braking includes using a PID controller to provide a regenerative braking torque command as a difference between the speed set-point and an actual vehicle speed.

17. The method according to claim 16 wherein the torque command is converted to a negative signal by a negative saturation circuit.

18. The method according to claim 14 wherein the vehicle is a fuel cell vehicle including a fuel cell stack and the electric traction motor.

* * * * *